UNITED STATES PATENT OFFICE.

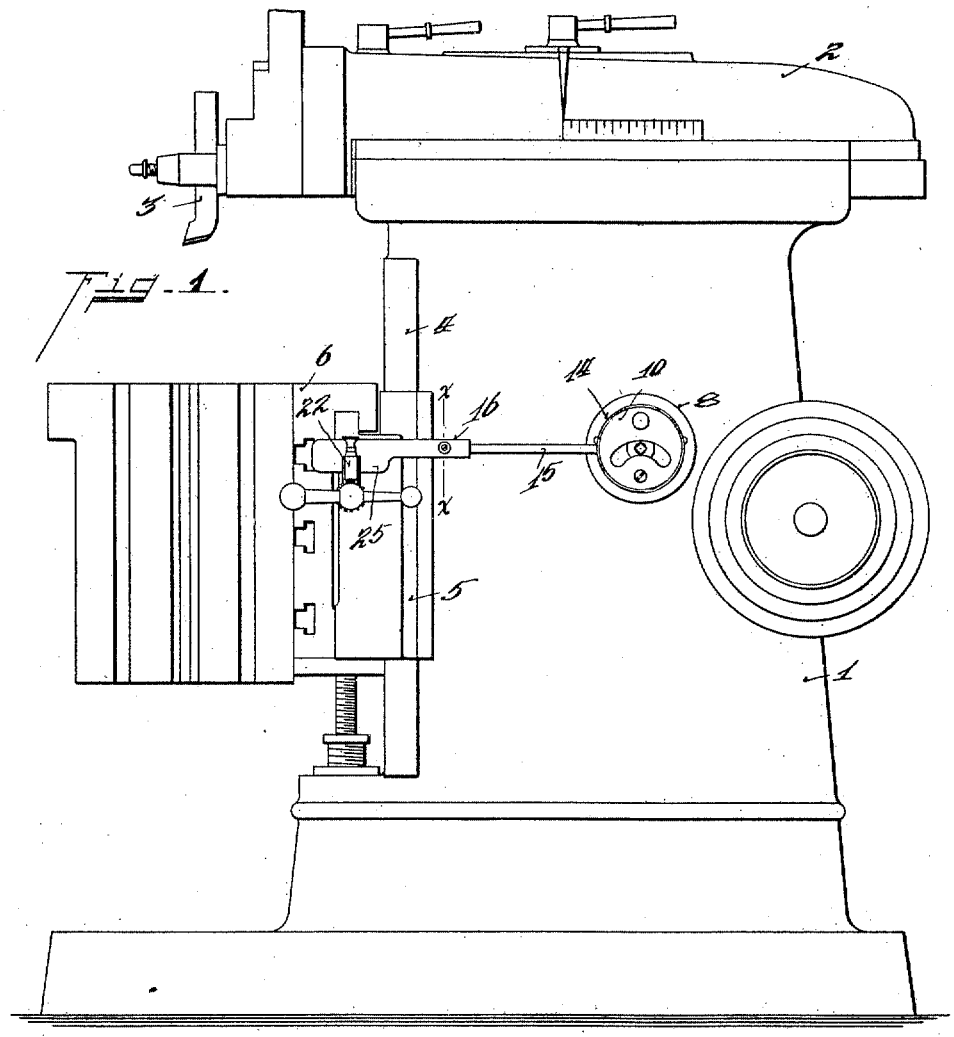

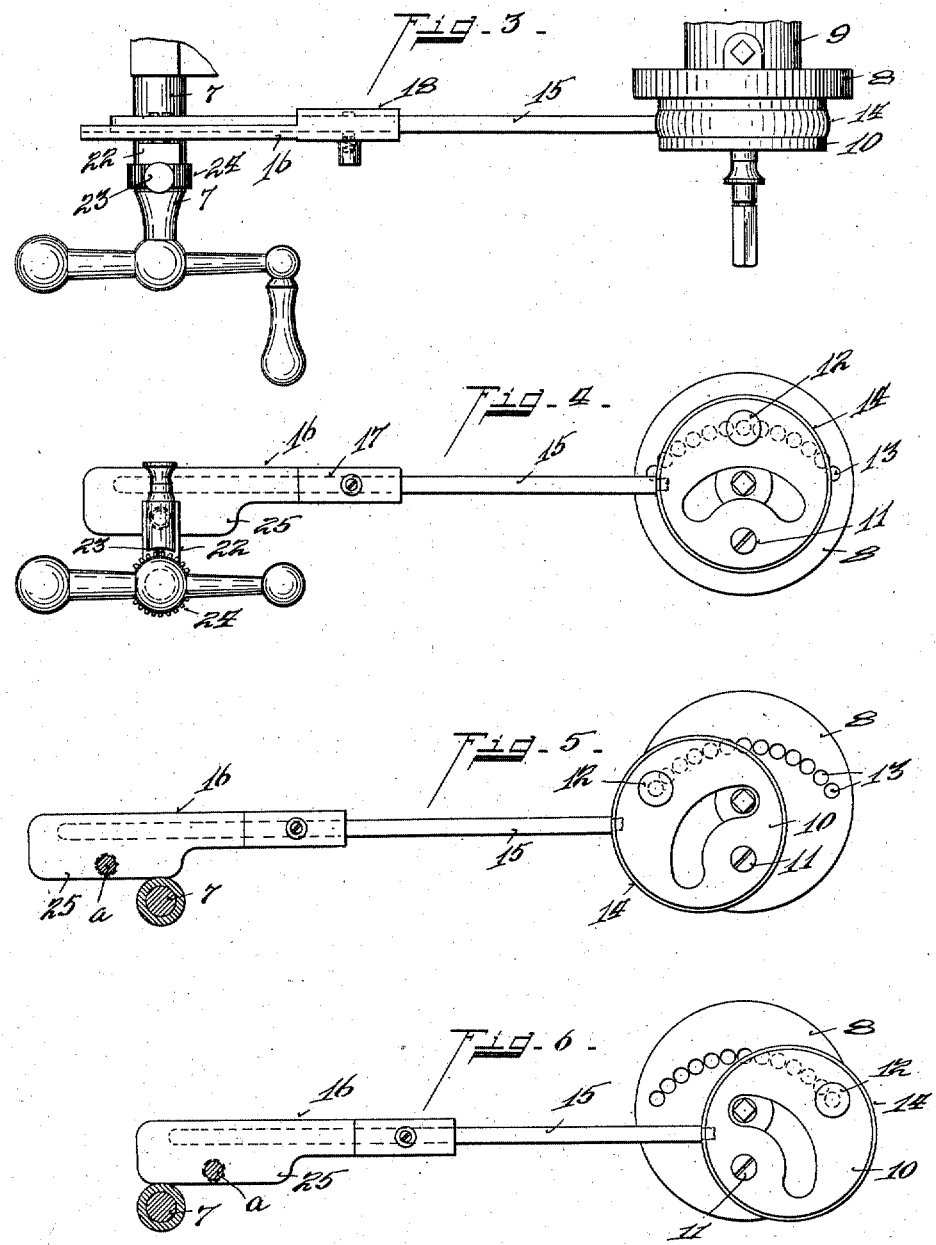

GEORGE KERR ATKINSON, OF CINCINNATI, OHIO, ASSIGNOR TO THE JOHN STEPTOE SHAPER COMPANY, OF CINCINNATI, OHIO, A CORPORATION OF OHIO.

FEED MECHANISM FOR SHAPERS.

986,123.     Specification of Letters Patent.     Patented Mar. 7, 1911.

Application filed December 13, 1909. Serial No. 532,813.

*To all whom it may concern:*

Be it known that I, GEORGE KERR ATKINSON, a citizen of the United States, residing at Cincinnati, in the county of Hamilton and State of Ohio, have invented certain new and useful Improvements in Feed Mechanism for Shapers, of which the following is a specification.

My invention relates to feed mechanism primarily employed upon shapers employing a reciprocating feed rod controlling the horizontal feed of the table upon the carriage.

The object of my invention is to provide a two part feed rod, actuating ratchet mechanism and cross feed screw for horizontally feeding the table upon its carriage, with the two members of the rod frictionally connected to automatically compensate for various lengths of the rod upon vertical feed of the carriage upon the shaper frame, and further in providing one of the feed rod members with means for limiting the reciprocating stroke in either direction.

The features of my invention are more fully set forth in the description of the accompanying drawings, forming a part of this specification, in which:—

Figure 1 is a side elevation of a shaper with my improvement applied. Fig. 2 is an enlarged section on line *x*, *x*, through the feed rod. Fig. 3 is a detail top plan view of my improved table feed rod, a portion of the feed screw and feed rod connection with the main drive shaft. Fig. 4 is a side elevation of the same. Fig. 5 is a similar view to Fig. 4 with the feed rod at the limit of its forward stroke, with the screw shaft in section for convenience of illustration. Fig. 6 is a view similar to Fig. 5, with the parts in a reverse position.

The shaper may be of any conventional type with a crank construction common in the art embodying a frame 1, provided with a crank shaft and mechanism for reciprocating the ram 2, carrying the cutting tool 3.

4 represents a vertical slideway upon the front of the frame 1.

5 represents the carriage or cross head vertically movable upon the way 4.

6 represents a table horizontally movable upon the carriage.

The carriage 5 is provided with the usual cross feed screw 7 in threaded engagement with a nut mounted or projecting from the table 6.

8 represents a circular feed plate fixed to the crank shaft 9.

10 represents a disk, adapted to be concentrically or eccentrically mounted upon the head plate 8 adjustable to various positions for changing the length of oscillating stroke of feed rod. In the preferred form of construction the disk is pivotally connected to the head plate 8 by means of a stud bolt 11.

12 represents a detent mounted upon the disk 10 and movable in an arc with the disk to engage with any one of the series of holes 13 formed in the head plate 8.

14 represents a ring loosely mounted in a peripheral groove on the feed disk.

15 represents one member of a two part feed rod connected to the ring 14.

The pitman mechanism above described is not made a part of this invention, the same being the subject matter of an application filed by me, Serial No. 446,764, filed August 3, 1908, for feed mechanism for shapers. It is also obvious however, that any form of pitman may be employed, or construction for converting rotary into reciprocatory motion to my improved feed rod.

16 represents a second member of the two part feed rod provided with a groove 17 upon one side thereof, into which the rod member 15 telescopically engages.

18 represents a housing formed upon one end of the rod member 16, through which the rod member 15 passes and frictionally connected therewith by means of the packing pieces 19 and 20 upon each side of the rod 15 and spring 21 bearing against the packing 20, (see Fig. 2).

22 represents a pawl plate pivotally mounted upon the screw rod 7, carrying the reversible pawl 23 adapted to engage with the ratchet wheel 24 fixed to the screw rod 7. The form of ratchet mechanism likewise may be of any design or form of construction common in the art or otherwise.

The pawl plate 22 is pivotally connected at *a* to the elongated flange 25 projecting from the rod member 16 and medially thereof, to permit the flange to engage against the screw rod after a predetermined arc of movement of the ratchet plate 22, thereby limiting the stroke of the feed rod and causing a slippage of the feed rod members 15 and 16 upon themselves to compensate for any increased movement imparted by the pitman mechanism to the rod member 15.

This construction of feed rod serves as safety means in preventing undue strain to be brought upon the screw and table nut after the table has been fed its entire length upon the carriage, the friction connection between the rod members, offering the least resistance, these move upon each other, and further the feed rod automatically accommodates itself in length upon raising or lowering the carriage.

Having described my invention, I claim:—

In a shaper having a main frame, a carriage vertically adjustable thereon, a crank shaft and pitman, a table horizontally movable upon the carriage, a feed screw therefor, a pawl and ratchet mechanism in connection with said screw, a two-part frictionally united feed rod intermediate the ratchet mechanism and the pitman, one member of the feed rod being pivotally connected to the said pawl mechanism, a flange projecting from said feed rod member upon each side of the pawl connection with the lower edge thereof, adapted to engage the feed screw at predetermined limits of rod stroke, substantially as described.

In testimony whereof, I have hereunto set my hand.

GEORGE KERR ATKINSON.

Witnesses:
J. W. Curts,
C. B. Foster.

Copies of this patent may be obtained for five cents each, by addressing the "Commissioner of Patents, Washington, D. C."